United States Patent
Narayanaswamy et al.

(10) Patent No.: US 12,368,934 B2
(45) Date of Patent: Jul. 22, 2025

(54) METHOD AND SYSTEM FOR SYNCHRONIZING PLAY POSITION BETWEEN MAIN PLAYER AND COMPANION DEVICES AND PROVIDING VALUE ADDED SERVICES

(71) Applicant: ARRIS Enterprises LLC, Suwanee, GA (US)

(72) Inventors: Ramesh Narayanaswamy, Bengaluru (IN); Anand Madhav Rao Hallur, Bengaluru (IN); Sandeep Guddekoppa Suresh, Bengaluru (IN); Krishna Prasad Panje, Bengaluru (IN)

(73) Assignee: ARRIS Enterprises LLC, Suwanee, GA (US)

( * ) Notice: Subject to any disclaimer, the term of this patent is extended or adjusted under 35 U.S.C. 154(b) by 110 days.

(21) Appl. No.: 18/204,178

(22) Filed: May 31, 2023

(65) Prior Publication Data
US 2023/0403442 A1    Dec. 14, 2023

Related U.S. Application Data

(60) Provisional application No. 63/351,765, filed on Jun. 13, 2022.

(51) Int. Cl.
*H04N 21/81* (2011.01)
*H04N 21/235* (2011.01)
(Continued)

(52) U.S. Cl.
CPC ..... *H04N 21/8146* (2013.01); *H04N 21/2353* (2013.01); *H04N 21/854* (2013.01); *H04N 21/41407* (2013.01)

(58) Field of Classification Search
CPC .......... H04N 21/8146; H04N 21/2353; H04N 21/854; H04N 21/41407
See application file for complete search history.

(56) References Cited

U.S. PATENT DOCUMENTS 8,978,075 B1    3/2015 Kaiser et al.
9,743,130 B2 *  8/2017 Holland ........... H04N 21/43079
(Continued)

OTHER PUBLICATIONS

International Search Report and Written Opinion RE: Application No. PCT/US2023/024013, dated May 31, 2023.

*Primary Examiner* — Mulugeta Mengesha
(74) *Attorney, Agent, or Firm* — Chernoff, Vilhauer, McClung & Stenzel, LLP (57) ABSTRACT

A companion device for use with a server device, a media device and a display device, the server device having stored therein a metadata manifest including metadata and time data associated with content and being configured to transmit the metadata manifest, the media device being configured to provide the content and content timing information to the display device, the display device being configured to display media, the content timing information being additionally associated with the time data, the companion device comprising: a memory having instructions stored therein; and a processor configured to execute the instructions stored in the memory to cause the companion device to: receive the content timing information from the media device; transmit a manifest request to the server device based on the content timing information; receive the metadata manifest from the server device; and instruct the display to display an icon based on the metadata.

18 Claims, 6 Drawing Sheets

(51) Int. Cl.
*H04N 21/854* (2011.01)
*H04N 21/414* (2011.01)

(56) References Cited

U.S. PATENT DOCUMENTS 10,116,719 B1 10/2018 Li et al.
2022/0109905 A1 4/2022 Comito et al.

* cited by examiner

METHOD AND SYSTEM FOR SYNCHRONIZING PLAY POSITION BETWEEN MAIN PLAYER AND COMPANION DEVICES AND PROVIDING VALUE ADDED SERVICES

CROSS REFERENCE TO RELATED APPLICATIONS

The present application claims priority to U.S. Provisional App. No. 63/351,765 filed Jun. 13, 2022, the contents of which are each incorporated herein by reference in their entirety.

BACKGROUND

Embodiments of the invention relate to viewing content on a display and using a companion device for supplemental content.

SUMMARY

Aspects of the present invention are drawn to a companion device for use with a server device, a media device and a display device, the server device having stored therein a metadata manifest including metadata and time data associated with content and being configured to transmit the metadata manifest, the media device being configured to provide the content to the display device and to provide content timing information associated with the content, the display device being configured to display media based on the content, the content timing information being additionally associated with the time data, the companion device including: a memory having instructions stored therein; and a processor configured to execute the instructions stored in the memory to cause the companion device to: receive the content timing information from the media device; transmit a manifest request to the server device based on the content timing information; receive the metadata manifest from the server device; and instruct the display to display an icon based on the metadata.

In some embodiments, the processor is configured to execute instructions stored in the memory to cause the companion device to receive the content timing information from the media device as one type of content timing information selected from a group of content timing information consisting of a presentation time stamp, a playback timer, a wall timer, and combinations thereof.

In some embodiments, the companion device further includes a display, wherein the processor is configured to execute instructions stored in the memory to cause the companion device to: receive the metadata manifest from the server device so as to include a plurality of time stamp sections; and instruct the display to display the icon based on the metadata, and to display a second icon based on the metadata.

In some embodiments, the companion device further includes a display, wherein the processor is configured to execute instructions stored in the memory to cause the companion device to instruct the display to display an icon based on the metadata.

In some embodiments, the processor is configured to execute instructions stored in the memory to cause the companion device to wirelessly transmit the manifest request to the server device.

In some embodiments, the processor is configured to execute instructions stored in the memory to cause the companion device to transmit the manifest request to the server device via a wired communication channel.

Other aspects of the present invention are drawn to a method of operating a companion device for use with a server device, a media device and a display device, the server device having stored therein a metadata manifest including metadata and time data associated with content and being configured to transmit the metadata manifest, the media device being configured to provide the content to the display device and to provide content timing information associated with the content, the display device being configured to display media based on the content, the content timing information being additionally associated with the time data, the method including: receiving, via a processor configured to execute instructions stored in a memory, the content timing information from the media device; transmitting, via the processor, a manifest request to the server device based on the content timing information; receiving, via the processor, the content timing information from the media device; transmitting, via the processor, a manifest request to the server device based on the content timing information; and receiving, via the processor, the metadata manifest from the server device.

In some embodiments, receiving the content timing information from the media device includes receiving the content timing information from the media device as one type of content timing information selected from a group of content timing information consisting of a presentation time stamp, a playback timer, a wall timer, and combinations thereof.

In some embodiments, the method further includes: receiving the metadata manifest from the server device so as to include a plurality of time stamp sections; and instructing a display to display the icon based on the metadata, and to display a second icon based on the metadata.

In some embodiments, the method further includes instructing a display to display an icon based on the metadata.

In some embodiments, the method, wherein the transmitting the manifest request to the server device, includes wirelessly transmitting the manifest request to the server device.

In some embodiments, the method, wherein the transmitting the manifest request to the server device, includes transmitting the manifest request to the server device via a wired communication channel.

Other aspects of the present invention are drawn to a non-transitory, computer-readable media having computer-readable instructions stored thereon, the computer-readable instructions being capable of being read by a companion device for use with a server device, a media device and a display device, the server device having stored therein a metadata manifest including metadata and time data associated with content and being configured to transmit the metadata manifest, the media device being configured to provide the content to the display device and to provide content timing information associated with the content, the display device being configured to display media based on the content, the content timing information being additionally associated with the time data, wherein the computer-readable instructions are capable of instructing the companion device to perform the method including: receiving, via a processor configured to execute instructions stored in a memory, the content timing information from the media device; transmitting, via the processor, a manifest request to the server device based on the content timing information; receiving, via the processor, the content timing information from the media device; transmitting, via the processor, a manifest request to the server device based on the content timing information; and receiving, via the processor, the metadata manifest from the server device.

In some embodiments, the non-transitory, computer-readable media, wherein the computer-readable instructions are capable of instructing the companion device to perform the method, wherein the receiving the content timing information from the media device includes receiving the content timing information from the media device as one type of content timing information selected from a group of content timing information consisting of a presentation time stamp, a playback timer, a wall timer, and combinations thereof.

In some embodiments, the non-transitory, computer-readable media, wherein the computer-readable instructions are capable of instructing the companion device to perform the method, wherein the receiving the metadata manifest from the server device includes: receiving the metadata manifest from the server device as a plurality of time stamp sections; and instructing a display to display the icon based on the metadata, and to display a second icon based on the metadata.

In some embodiments, the non-transitory, computer-readable media, wherein the computer-readable instructions are capable of instructing the companion device to perform the method further including instructing a display to display an icon based on the metadata.

In some embodiments, the non-transitory, computer-readable media, wherein the computer-readable instructions are capable of instructing the companion device to perform the method wherein the transmitting the manifest request to the server device includes wirelessly transmitting the manifest request to the server device.

In some embodiments, the non-transitory, computer-readable media, wherein the computer-readable instructions are capable of instructing the companion device to perform the method wherein the transmitting the manifest request to the server device includes transmitting the manifest request to the server device via a wired communication channel.

Aspects of the present invention are also drawn to a server device for use with a metadata manifest provider and a companion device, the metadata manifest provider being configured to provide a metadata manifest, the companion device being configured to provide a manifest request, the metadata manifest including metadata and time data associated with content, the manifest request including content timing information, the content timing information being associated with the time data, the server device including: a memory having instructions stored therein; and a processor configured to execute the instructions stored in the memory to cause the server device to: receive the metadata manifest; receive the manifest request; and transmit a portion of the metadata, based on the content timing information, to the companion device.

In some embodiments, the server device, wherein the content timing information includes one type of content timing information selected from a group of content timing information consisting of a presentation time stamp, a playback timer, a wall timer, and combinations thereof.

In some embodiments, the processor is configured to execute instructions stored in the memory to cause the server device to wirelessly transmit the portion of the metadata to the companion device.

In some embodiments, the processor is configured to execute instructions stored in the memory to cause the server device to transmit the portion of the metadata to the companion device via a wired communication channel.

Other aspects of the present invention are drawn to a method of operating a server device with a metadata manifest provider and a companion device, the metadata manifest provider being configured to provide a metadata manifest, the companion device being configured to provide a manifest request, the metadata manifest including metadata and time data associated with content, the manifest request including content timing information, the content timing information being associated with the time data, the method including: receiving, via a processor configured to execute instructions stored in a memory, the content timing information from the media device; receiving, via a processor configured to execute instructions stored in a memory, the metadata manifest; receiving, via the processor, the manifest request; and transmitting, via the processor, a portion of the metadata, based on the content timing information, to the companion device.

In some embodiments, the method, wherein the content timing information includes one type of content timing information selected from a group of content timing information consisting of a presentation time stamp, a playback timer, a wall timer, and combinations thereof.

In some embodiments, the method, wherein the transmitting the portion of the metadata includes wirelessly transmitting the portion of the metadata to the server companion device.

In some embodiments, the method, wherein the transmitting the portion of the metadata includes transmitting the portion of the metadata to the companion device via a wired communication channel.

Other aspects of the present invention are drawn to a non-transitory, computer-readable media having computer-readable instructions stored thereon, the computer-readable instructions being capable of being read by server device for use with a metadata manifest provider and a companion device, the metadata manifest provider being configured to provide a metadata manifest, the companion device being configured to provide a manifest request, the metadata manifest including metadata and time data associated with content, the manifest request including content timing information, the content timing information being associated with the time data, wherein the computer-readable instructions are capable of instructing the server device to perform the method including: receiving, via a processor configured to execute instructions stored in a memory, the content timing information from the media device; receiving, via a processor configured to execute instructions stored in a memory, the metadata manifest; receiving, via the processor, the manifest request; and transmitting, via the processor, a portion of the metadata, based on the content timing information, to the companion device.

In some embodiments, the non-transitory, computer-readable media, wherein the computer-readable instructions are capable of instructing the server device to perform the method, wherein the content timing information includes one type of content timing information selected from a group of content timing information consisting of a presentation time stamp, a playback timer, a wall timer, and combinations thereof.

In some embodiments, the non-transitory, computer-readable media, wherein the computer-readable instructions are capable of instructing the server device to perform the method, wherein the transmitting the portion of the metadata includes wirelessly transmitting the portion of the metadata to the server companion device.

In some embodiments, the non-transitory, computer-readable media, wherein the computer-readable instructions are capable of instructing the server device to perform the method wherein the transmitting the portion of the metadata includes transmitting the portion of the metadata to the companion device via a wired communication channel.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

While watching a program on television, a user may want to know additional information related to a specific scene, personal information about an actor, or something else related to the program. Often, a user will have a companion device which they will use to find the additional information, non-limiting examples of a companion device including a smart phone, a tablet, etc. Taking time to pause the program to research this information can be frustrating. Conversely, a user could also let the program continue to play as they research, but they may miss an important part of the program as they focus on their companion device.

In some prior art systems, a service provider might add metadata into the content being delivered to the media device of the user. Such metadata may include cast information, URL links to merchants to purchase goods shown in the content, etc. However, with these systems, the amount of metadata added throughout the content greatly increases the amount of data that needs to be encoded prior to transmission and then decoded at reception at the media device of the user. Therefore, much more resources are required. Further, if the metadata changes, for example for future broadcasts of the content, then the future content must be re-encoded with the new metadata.

There is a need for a mechanism where content consumption on the companion device is enhanced, thereby improving the playback experience of the TV program, without drastically increasing the amount of resources needed to encode/decode the content and metadata.

What is needed is a system and method for enhancing content consumption through the use of a companion device without drastically increasing the amount of resources needed to encode/decode the content and metadata.

A system and method in accordance with the present disclosure enhances content consumption through the use of a companion device without drastically increasing the amount of resources needed to encode/decode the content and metadata.

In accordance with the present disclosure, a content delivery network (CDN) server provides content to a media device, for example a set-top box at a user's home. For purposes of discussion, let the content be a movie. Further a manifest creator creates a metadata manifest that associates certain metadata to respective time periods of the movie. For purposes of discussion, let the metadata manifest include entries for every 10 seconds of the movie, wherein each entry includes cast information at that time period of the movie, URL links for merchants that sell clothing that the cast may be wearing at that time period of the movie, trick play instructions to enable to user to pause, rewind, fast forward, etc. The metadata manifest is stored on a server device.

The media device receives the content and plays the content for the user to watch. The user will also operate a companion device while watching content. The media device, while providing content to the user through the use of a display device, will periodically provide the companion device with content timing information. The companion device will analyze the content timing information and will request a metadata manifest from the server device. The server device will transmit the metadata manifest to the companion device based on the content timing information. The companion device will then display interactive icons via a graphic user interface (GUI) to the user. These icons will allow the user to interact with information related to the content they are watching.

Therefore, as opposed to prior art systems wherein the metadata must be transmitted with the content, and decoded by the media device, in accordance with aspects of the present disclosure, the heavy lifting of storing and transmitting the metadata to the companion device is handled by the server device. As such, much less resources are used by the medio device, which merely needs to transmit content timing information. As will be described in greater detail below, in an example embodiment, the content timing information is a presentation time stamp, which is readily available in the content.

An example system and method for enhancing content consumption through the use of a companion device in accordance with aspects of the present disclosure will now be described in greater detail with reference to FIGS. 1-6.

Figure 1:
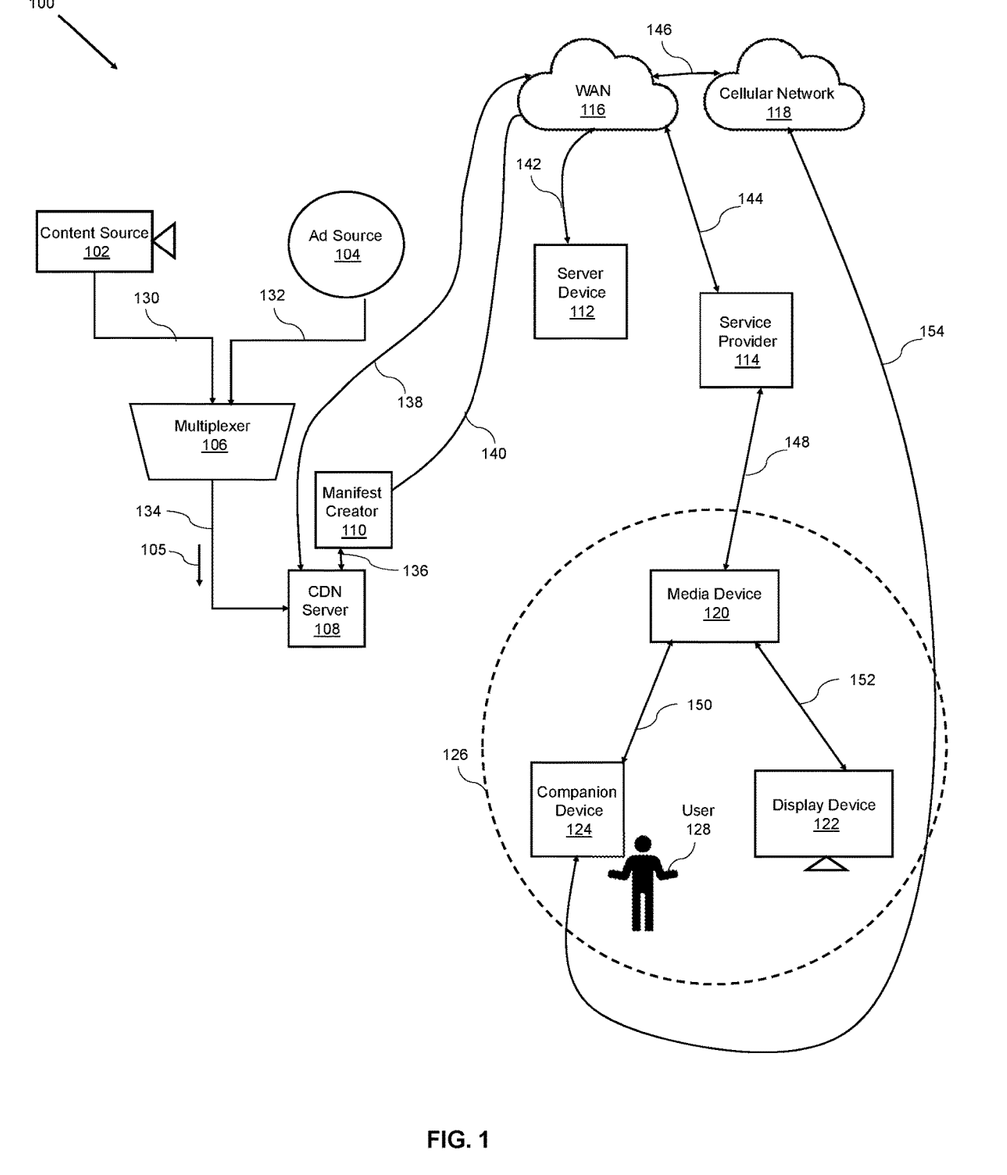
FIG. 1 illustrates a communication system in accordance with aspects of the present disclosure.

FIG. 1 illustrates a communication system 100 in accordance with aspects of the present disclosure.

As shown in the figure, communication system 100 includes: a content source 102; an ad source 104; a multiplexer 106; a content delivery network (CDN) server 108; a manifest creator 110; a server device 112; a service provider 114; a wide area network (WAN) 116, for example the Internet; a cellular network 118; a media device 120; a display device 122; a companion device 124; a local area network (LAN) 126; a user 128; and communication channels 130, 132, 134, 136, 138, 140, 142, 144, 146, 148, 150, 152 and 154.

In this example, content source 102, ad source 104, multiplexer 106, CDN server 108 and manifest creator 110 are illustrated as individual devices. However, in some embodiments, at least two of content source 102, ad source 104, multiplexer 106, CDN server 108 and manifest creator 110 may be combined as a unitary device. Further, in some embodiments, at least one of content source 102, ad source 104, multiplexer 106, CDN server 108 and manifest creator 110 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

In embodiments where multiplexer 106 is not a unitary device with content source 102, ad source 104, or CDN server 108, multiplexer 106 is arranged to communicate with content source 102 via a communication channel 130, to communicate with ad source 104 via a communication channel 132, and with CDN server 108 via a communication channel 134. Communication channels 130, 132 and 134 may be any known type of wired or wireless communication channel.

In embodiments where CDN server 108 is not a unitary device with manifest creator 110, CDN server 108 is additionally arranged to communicate with manifest creator 110 via a communication channel 136. CDN server 108 is additionally arranged to communicate with WAN 116 via a communication channel 138. Communication channels 136 and 138 may be any known type of wired or wireless communication channel.

Manifest creator 110 is additionally arranged to communicate with WAN 116 via a communication channel 140. Communication channel 140 may be any known type of wired or wireless communication channel.

WAN 116 is additionally arranged to communicate with server device 112 via a communication channel 142, to communicate with service provider 114 via a communication channel 144, and with cellular network 118 via a communication channel 146. Communication channels 142, 144, and 146 may be any known type of wired or wireless communication channel.

In this example, server device 112 and service provider 114 are illustrated as individual devices. However, in some embodiments, server device 112 and service provider 114 may be combined as a unitary device. Further, in some embodiments, at least one of server device 112 and service provider 114 may be implemented as a computer having tangible computer-readable media for carrying or having computer-executable instructions or data structures stored thereon. In embodiments where server device 112 and service provider 114 may be combined as a unitary device, WAN 116 may be arranged to communicate with the combined device by any known single communication channel.

Service provider 114 is additionally arranged to communicate with media device 120 via a communication channel 119. Communication channel 119 may be any known type of wired or wireless communication channel. In embodiments wherein communication channel 119 is a wired communication channel, communication channel may take the form of a data over cable service interface specification (DOCSIS) communication channel or passive optical network (PONs) communication channel.

Media device 120 is additionally arranged to communicate with companion device 124 via a communication channel 150 and with display device 152 via a communication channel. In this example, communication channel 150 is a wireless communication channel provided by LAN 126, for example through Wi-Fi. Communication channel 152 may be any known type of wired or wireless communication channel.

Companion device 124 is additionally arranged to communicate with cellular network 118 via a wireless communication channel 154, for example a cellular communication channel.

Content source 102 may be any device or system that is configured to provide content data corresponding to content, for example a movie.

Ad source 104 may be any device or system that is configured to provide advertisement data corresponding to advertisement to be inserted into the content. The content data from content source 102 and the advertisement data from ad source 104 are provided to multiplexer 106.

Multiplexer 106 may be any device or system that is configured to combine content data from content source 102 and advertisement data from ad source 104 into modified content data 105 and to transmit modified content data 105 to CDN server 108.

CDN server 108 may be any device or system that is configured to deliver modified content data 105 to manifest creator 110.

Manifest creator 110 may be any device or system that is configured to create a metadata manifest of supplemental metadata. The metadata manifest associates predetermined time periods within the modified content data 105 with respective supplemental metadata. Non-limiting examples of supplemental metadata include links to purchase items available in advertisements, additional information about how a scene was made, or additional information on an actor, etc. The predetermined time periods may be at: predetermined time slots as measured by presentation time stamps (PTSs); predetermined time periods based on play time of the content, for example every 10 seconds of playing time; or predetermined wall clock time periods based on the start of the content, for example every 10 seconds after the content starts playing—to be differentiated from the play time of content which might be paused by the user.

The supplemental data is associated with a time value corresponding to a time of the content. Therefore, the supplemental data may be provided to a user when the program they are viewing reaches that time.

Manifest creator 110 may be any device or system that is additionally configured to transmit the metadata manifest server device 112.

CDN server 108 may be any device or system that is additionally configured to, after manifest creator 110 transmits the metadata manifest to server device 112, deliver modified content data 105 to service provider 114.

Server device 112 may be any device or system that is configured to receive the metadata manifest from manifest creator 110, to store the metadata manifest, to receive a manifest request, and to subsequently provide the metadata manifest upon receipt of the manifest request.

Service provider 114 may be any device or system that is configured to receive modified content data 105 by way of communication channel 138, WAN 116 and communication channel 144. Service provider may be any device or system that is additionally configured to provide modified content data 105 to media device 120 via communication channel 148. Service provider 114 may be any device or system that is additionally configured to provide access to WAN 116 from LAN 126. Service provider 114 may be any device or system that is additionally configured to provide content from CDN server 108 to media device 120 and manifest metadata from manifest creator 110.

LAN 126 is created and managed through a gateway device not shown in the figure. A gateway device serves as a gateway or access point to WAN 116 for one or more electronic devices. LAN 126 is illustrated as a single network, merely for purposes of discussion. It should be noted that LAN 126 may represent a plurality of local area networks created and managed through a gateway device. LAN 126 is a communication network where connected devices can wirelessly communicate to access WAN 116. As such, for purposes of this discussion, LAN 126 includes a wireless network for companion device 124 to wirelessly communicate with media device 120.

Media device 120 may be any device or system that is configured to receive modified content data 105 from service provider 112 and to decode the modified content data 105 to obtain content timing information and content to be displayed on display device 122. Media device 120 may be any device or system that is additionally configured to transmit the content data to display device 122 to be viewed by user 128. A non-limiting example of media device 120 is a set-top box. Media device 120 may be any device or system that is additionally configured to transmit the content timing information to companion device 124.

Media device 120 is arranged to communicate with other connected devices in LAN 126. In some embodiments, user 128 may use companion device 124 to instruct media device 120 to complete a task, a non-limiting example of which may include rewinding the content.

Display device 122 may be any device that is configured to present data received from media device 120 in visual and audio form.

Companion device 124 may be any device or system that is configured to present content to, accept inputs from, or directly or indirectly interact with user 128. In this non-limiting example, companion device 124 may be a smart phone, tablet, or personal computer. Companion device 124 may be any device or system that is additionally configured to transmit a manifest request to service device 112 based on the content timing information received from media device 120.

In some embodiments, companion device 124 is configured to wirelessly transmit the manifest request to service device 112 via wireless communication channel 154, cellular network 118, communication channel 146, WAN 116 and communication channel 142.

In some embodiments, companion device 124 is configured to transmit the manifest request to service device 112 via a wired communication channel that includes a path via LAN 126 by way of communication channel 150 to media device 120, communication channel 148, service provider 114, communication channel 144, WAN 116, and communication channel 142.

Server device 112 may be any device or system that is additionally configured to, in response to receiving the manifest request from companion device 124, provide the metadata manifest to companion device 124.

In some embodiments, server device 112 is configured to wirelessly transmit the manifest metadata to companion device 124 via communication channel 142, WAN 116, communication channel 146, cellular network 118 and wireless communication channel 154.

In some embodiments, server device 112 is configured to transmit the metadata manifest to companion device 124 via a wired communication channel that includes a path via communication channel 142, WAN 116, communication channel 144, service provider 114, communication channel 119, and LAN 126.

The operation of server device 112 and companion device 124 will be described using separate algorithms below.

Figure 2:
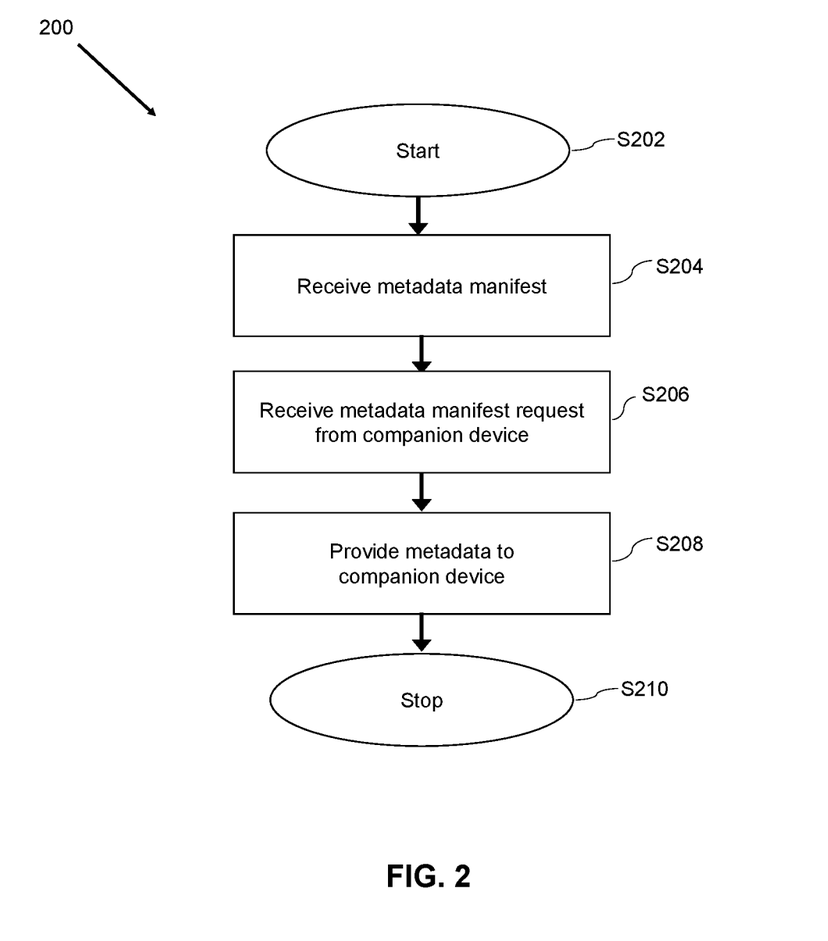
FIG. 2 illustrates an algorithm to be executed by a server device in accordance with aspects of the present disclosure.

FIG. 2 illustrates an algorithm 200 to be executed by server device 112 in accordance with aspects of the present disclosure.

As shown in FIG. 2, algorithm 200 starts (S202) and the metadata manifest is received (S204). For example, presume that multiplexer 106 has packaged content data from content source 102 and advertisement data from ad source 104 into modified content data 105, and provided modified content data 105 to CDN server 108, as referenced in FIG. 1. CDN server 108 provides modified content data 105 to manifest creator 110 via communication channel 136. Manifest creator 110 creates a metadata manifest, which is associated with modified content data 105. As discussed above the metadata manifest includes a plurality of time entries of the modified content data 105, wherein each entry may have associated metadata, which may include cast information, advertisements, etc.

Manifest creator 110 will then transmit the metadata manifest to server device 112 via wireless communication channel 140, WAN 116, and wireless communication channel 142. Server device 112 then stores the metadata manifest.

Returning to FIG. 2, after the metadata manifest is received (S204), the metadata manifest is requested by the companion device (S206). This will be described in greater detail with reference to FIG. 4.

Figure 4:
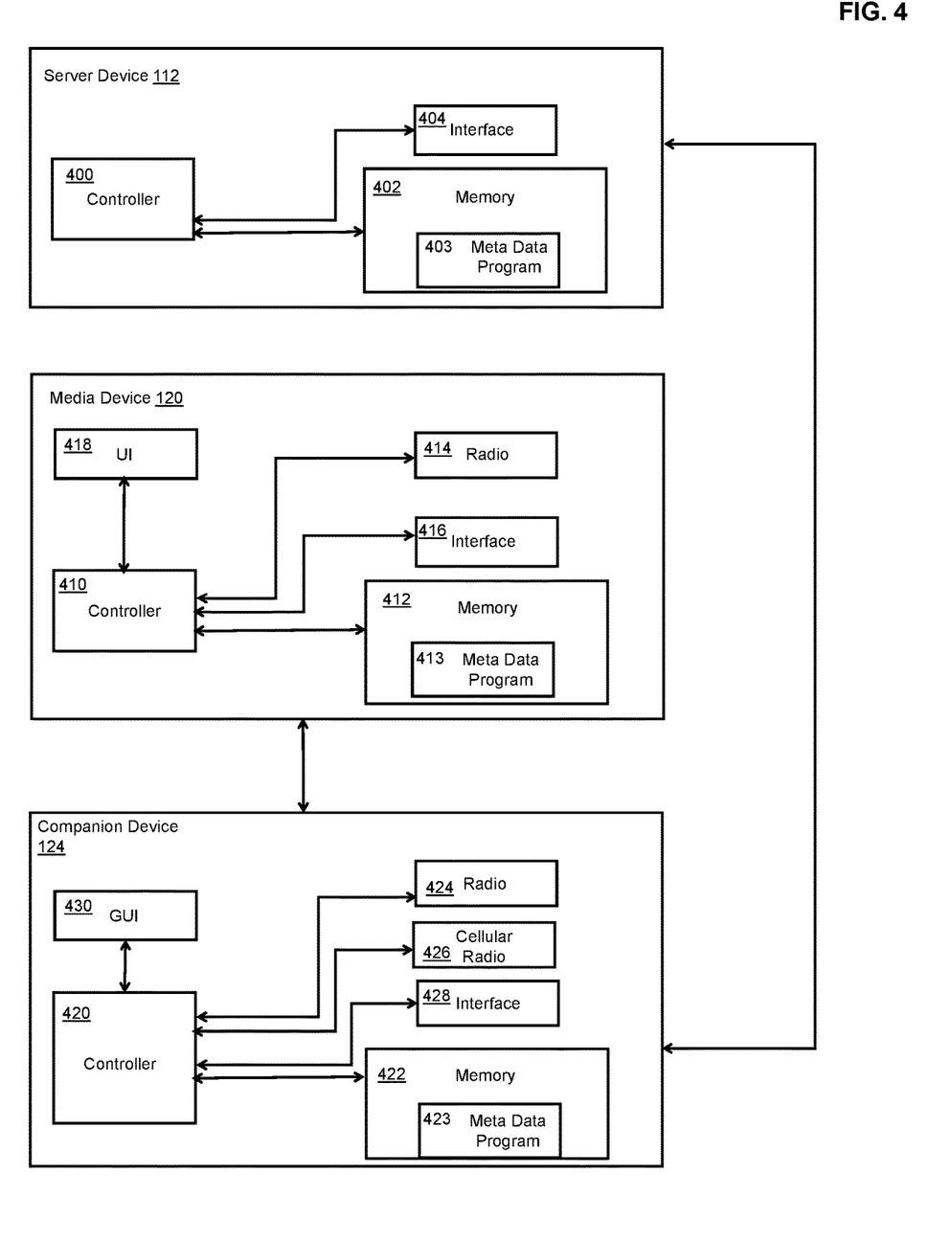
FIG. 4 illustrates an exploded view of a server device, a media device, and a companion device in accordance with aspects of the present disclosure.

FIG. 4 illustrates an exploded view of server device 112, media device 120, and companion device 124 in accordance with aspects of the present disclosure.

As shown in the figure, server device 112 includes: a controller 400; a memory 402, which has stored therein a meta data program 403; and an interface 404.

In this example, controller 400, memory 402, and interface 404 are illustrated as individual devices. However, in some embodiments, at least two of controller 400, memory 402, and interface 404 may be combined as a unitary device. Further, in some embodiments, at least one of controller 400 and memory 402 may be implemented as a computer having tangible computer-readable media for carrying or having computer-executable instructions or data structures stored thereon.

Controller 400 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of any client devices in the network in accordance with the embodiments described in the present disclosure.

Memory 402 has meta data program 403 stored therein. As will be described in greater detail below, meta data program 403 has instructions stored therein to be executed by controller 400 to cause server device to: receive the metadata manifest; receive a manifest request; and transmit a portion of the metadata, based on content timing information, to companion device 124.

In some embodiments, memory 402, as will be described in greater detail below, meta data program 403 has instructions stored therein to be executed by controller 400 to cause server device to transmit the portion of the metadata to companion device 124 via a wired communication channel.

In some embodiments, memory 402, as will be described in greater detail below, meta data program 403 has instructions stored therein to be executed by controller 400 to cause server device to wirelessly transmit the portion of the metadata to the companion device.

Interface 404 can include one or more connectors, such as RF connectors, or Ethernet connectors, and/or wireless communication circuitry, such as 5G circuitry and one or more antennas.

As shown in FIG. 4, media device 120 includes: a controller 410; a memory 412, which has stored therein a meta data program 413; a radio 414; an interface 416; and a user interface (UI) 418.

In this example, controller 410, memory 412, radio 414, and interface 416 are illustrated as individual devices. However, in some embodiments, at least two of controller 410, memory 412, radio 414, and interface 416 may be combined as a unitary device. Further, in some embodiments, at least one of controller 410 and memory 412 may be implemented as a computer having tangible computer-readable media for carrying or having computer-executable instructions or data structures stored thereon.

Controller 410 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of extender 302 in accordance with the embodiments described in the present disclosure.

Memory 412, as will be described in greater detail below, has instructions, including meta data program 413, stored therein to be executed by controller 410. Meta data program 413 includes instruction to be executed by controller 410 to cause the media device to: receive content from CDN server 108; provide content to display device 122; and provide content timing information to companion device 124.

In some embodiments, the content timing information will be broadcast at intervals, non-limiting examples of which include 1 second intervals or 10 second intervals. In some embodiments, the content timing information may be one type of content timing information selected from a group of content timing information consisting of a presentation time stamp, a playback timer, a wall timer, and combinations thereof. As will be described in greater detail below, a presentation time stamp may be extracted from types of encoded content data. A playback timer may be derived from a start time of the content, and will not continue for example, if the user pauses the content. A wall timer may be derived from a start time of the content, and will continue if the user pauses the content.

Radio 414 may include a Wi-Fi WLAN interface radio transceiver that is operable to communicate with companion device 124. Radio 414 includes one or more antennas and communicate wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radio 414 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Companion device 124 includes: a controller 420; a memory 422, which has stored thereon a metadata program 423; a radio 424; a cellular radio 426; an interface 428; and a graphic user interface (GUI) 430.

In this example, controller 420, memory 422, radio 424, cellular radio 426, and interface 428 are illustrated as individual devices. However, in some embodiments, at least two of controller 420, memory 422, radio 424, cellular radio 426, and interface 428 may be combined as a unitary device. Further, in some embodiments, at least one of controller 420 and memory 422 may be implemented as a computer having tangible computer-readable media for carrying or having computer-executable instructions or data structures stored thereon.

Controller 420 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 304 in accordance with the embodiments described in the present disclosure.

Memory 422 as will be described in greater detail below, has instructions, including meta data program 423, stored therein to be executed by controller 420. Meta data program 423 includes instructions to be executed by controller 420 to cause the companion device to: receive the content timing information from media device 120; transmit a manifest request to server device 112 based on the content timing information; receive the metadata manifest from server device 112; and instruct display device 122 to display an icon based on the metadata.

In some embodiments, as will be described in greater detail below, meta data program 423 has instructions stored therein to be executed by controller 420 to cause companion device 124 to: receive the content timing information from media device 120 as one type of content timing information selected from a group of content timing information consisting of a presentation time stamp, a playback timer, a wall timer, and combinations thereof.

In some embodiments, as will be described in greater detail below, meta data program 423 has instructions stored therein to be executed by controller 420 to cause companion device 124 to: receive the metadata manifest from server device 112 so as to include a plurality of time stamp sections; and instruct display device 122 to display the icon based on the metadata, and to display a second icon based on the metadata.

In some embodiments, as will be described in greater detail below, meta data program 423 has instructions stored therein to be executed by controller 420 to cause companion device 124 to instruct display device 122 to display an icon based on the metadata.

In some embodiments, as will be described in greater detail below, meta data program 423 has instructions stored therein to be executed by controller 420 to cause companion device 124 to wirelessly transmit the manifest request to server device 112.

In some embodiments, as will be described in greater detail below, meta data program 423 has instructions stored therein to be executed by controller 420 to cause companion device 124 to transmit the manifest request to server device 112 via a wired communication channel.

Radio 424 may include a Wi-Fi WLAN interface radio transceiver that is operable to communicate with media device 120. Radio 424 includes one or more antennas and communicates wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radio 424 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Cellular radio 426 is configured to communicate with WAN 116 through cellular network 118 via communication channel 154.

Interface 428 can include one or more connectors, such as RF connectors, or Ethernet connectors, and/or wireless communication circuitry, such as 5G circuitry and one or more antennas. Interface 428 receives data from service provider 114 by known methods, non-limiting examples of which include terrestrial antenna, satellite dish, wired cable, DSL, optical fibers, or 5G as discussed above.

Returning to FIG. 2, for example, presume that user 128 is watching a film on display device 122. Further, user 128 would like to learn more about an actor that is in the film. User 128 may operate companion device 124 and interact with GUI 430. More specifically, controller 420 of companion device 124 is configured to execute instructions stored on memory 422, including meta data program 423, causing radio 424 to instruct server device 112, via wireless communication channel 150, communication channel 148, service provider 114, communication channel 144, WAN 116, and communication channel 142, to provide the metadata that user 128 requested.

In some embodiments, companion device 124 may be a device utilizing cellular service, in which case user 128 may use companion device 124 to communicate with server device 112 cellularly. More specifically, controller 420 of companion device 124 is configured to execute instructions stored on memory 422, including meta data program 423, causing cellular radio 426 to instruct server device 112, via wireless communication channel 154, cellular network 118, wireless communication channel 146, WAN 116, and wireless communication channel 142, to provide the metadata manifest that user 128 requested.

Returning to FIG. 2, after the metadata manifest is requested by the companion device (S206), the metadata is provided to the companion device (S208). For example, after server device 112 receives the metadata manifest request from companion device 124, controller 400 of server device 112 is configured to execute instructions stored on memory 402, including meta data program 403, causing server device 112 to transmit, via wireless communication channel 115, service provider 114, and wireless communication channel 121, the metadata of the metadata manifest that is associated with content timing information to companion device 124.

In some embodiments, server device 112 may transmit the metadata to companion device 124 via cellular network communication. More specifically, controller 400 of server device 112 is configured to execute instructions stored on memory 402, including meta data program 403, causing server device 112 to transmit the metadata to companion device 124, via communication channel 142, WAN 116, communication channel 146, cellular network 118, and wireless communication channel 154.

Returning to FIG. 2, after the metadata manifest is provided to the companion device (S208), algorithm 200 stops (S210).

In some embodiments, the metadata manifest may be continuously updated and metadata from the continuously updated metadata manifest may be provided to companion device 124, opposed to delivering the metadata once, e.g., when user 128 is watching a live television program.

The algorithm for the operation of companion device 124 will now be discussed in greater detail with reference to FIG. 3.

Figure 3:
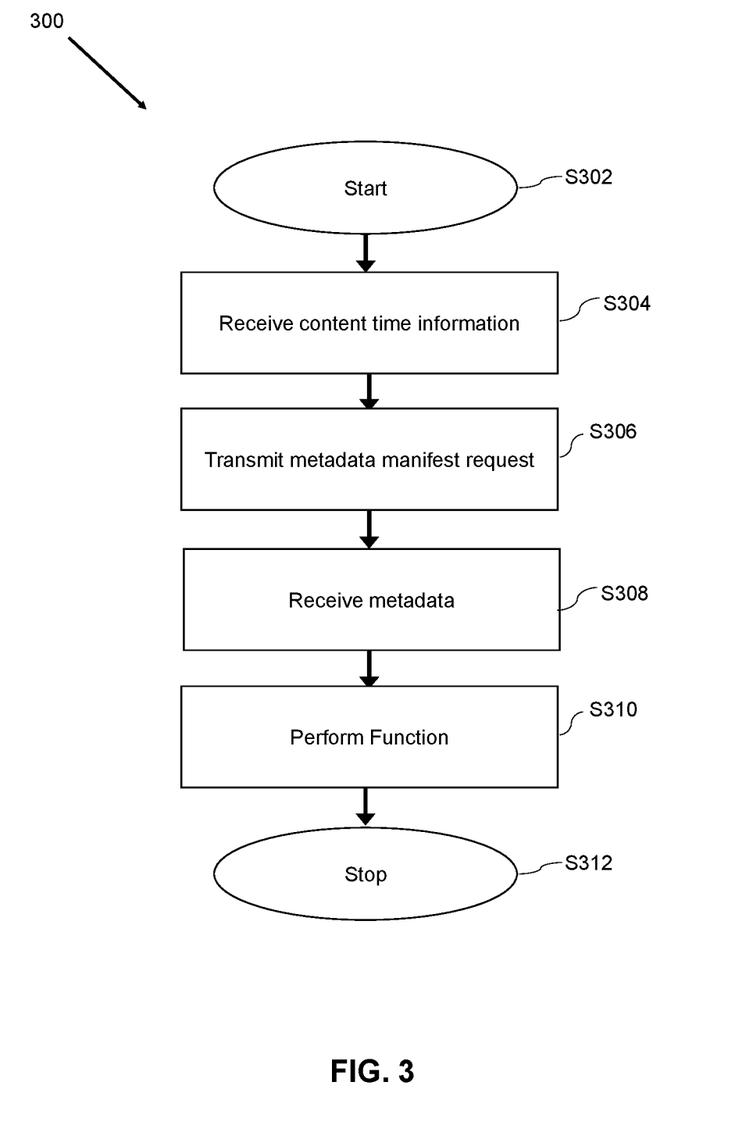
FIG. 3 illustrates an algorithm to be executed by a companion device in accordance with aspects of the present disclosure.

FIG. 3 illustrates an algorithm 300 to be executed by companion device 124 in accordance with aspects of the present disclosure.

As shown in FIG. 3, algorithm 300 starts (S302) and content timing information is received (S304). This will be described in greater detail with reference to FIG. 5.

Figure 5:
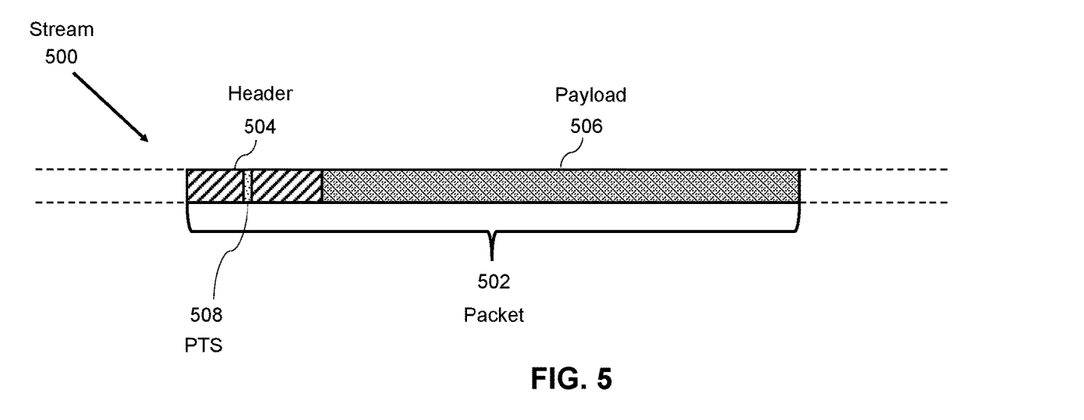
FIG. 5 illustrates a data stream in accordance with aspects of the present disclosure.

FIG. 5 illustrates a Moving Pictures Experts Group (MPEG) data stream 500 in accordance with aspects of the present disclosure.

As shown in the figure, data stream 500 includes a plurality of packets, a sample of which is shown as a packet 502. Each packet includes a payload and a header. In this example, packet 502 includes a header 504 and a payload 506. Header 504 includes information about payload 506, and additionally includes a presentation time stamp (PTS) 508. Payload 506 includes image and audio data. PTS 508 is metadata used to indicate when the accompanying image data within payload 506 should be displayed. Media device 120 receives data stream 500 and decodes it to present it to display device 122.

PTS 508 is a sample embodiment of content timing information. In some embodiments, PTS 508 could be replaced with different content timing information, non-limiting examples of which include a playback timer, a wall timer, and combinations thereof. Media device 120 uses PTS 508 in order to supply the data in chronological order to display 116.

It should be noted that MPEG data stream 500 is merely representative of a mechanism to provide content timing information, which in that case includes PTS 508 in header 504. However, any known mechanism for providing content timing information may be used in accordance with aspects of the present disclosure. Another non-limiting example includes using a transport stream (TS) packet, wherein the PTS is part of the payload. Using multiple packets, a packetized elementary stream (PES) may be constructed, wherein the PTS would be part of the PES header.

Returning to FIG. 1, for example, presume that user 128 has decided to watch a film on display device 122. In this example, presume that service provider 114 provide the modified content data 105 to media device 120 as an MPEG stream as discussed above with reference to FIG. 5. Controller 410 of media device 120, as referenced in FIG. 4, is configured to execute instructions stored on memory 412, including meta data program 413, causing media device 120 to transmit, via radio 414, PTS 508 to companion device 124. Controller 420 of companion device 124 is configured to execute instructions stored on memory 422, including meta data program 423, causing companion device 124 to receive PTS 508 and recognize PTS 508 as content timing information.

Returning to FIG. 3, after content timing information is received (S304), the metadata manifest request is automatically transmitted (S306). For example, companion transmit a metadata manifest request to server device 112. More specifically, after companion device 124 analyzes PTS 508, controller 420 will execute instructions stored on memory 422, including meta data program 423, causing companion device 124 to transmit a metadata manifest request to server device 112 (see S206). The metadata manifest request includes the content timing information, which in this example is PTS 508.

Returning to FIG. 3, after the metadata manifest request is transmitted (S306), the metadata manifest is received (S308). For example, after server device 112 receives the metadata manifest request from companion device 124, controller 400 of server device 112 will execute instructions stored on memory 402, including meta data program 403, causing server device 112 to extract the metadata in the metadata manifest that is associated with PTS 508. In other words, server device 112 extracts the supplemental data associated with that specific time period in the movie.

Controller 400 of server device 112 will execute instructions stored on memory 402, including meta data program 403, causing server device 112 to transmit the metadata of the metadata manifest that is associated with the content timing information to companion device 124.

Returning to FIG. 3, after the metadata is received (S308), a function is performed (S310). In some example embodiments, the function is the display of an icon to user 128. This will be discussed in greater detail with reference to FIG. 6.

Figure 6:
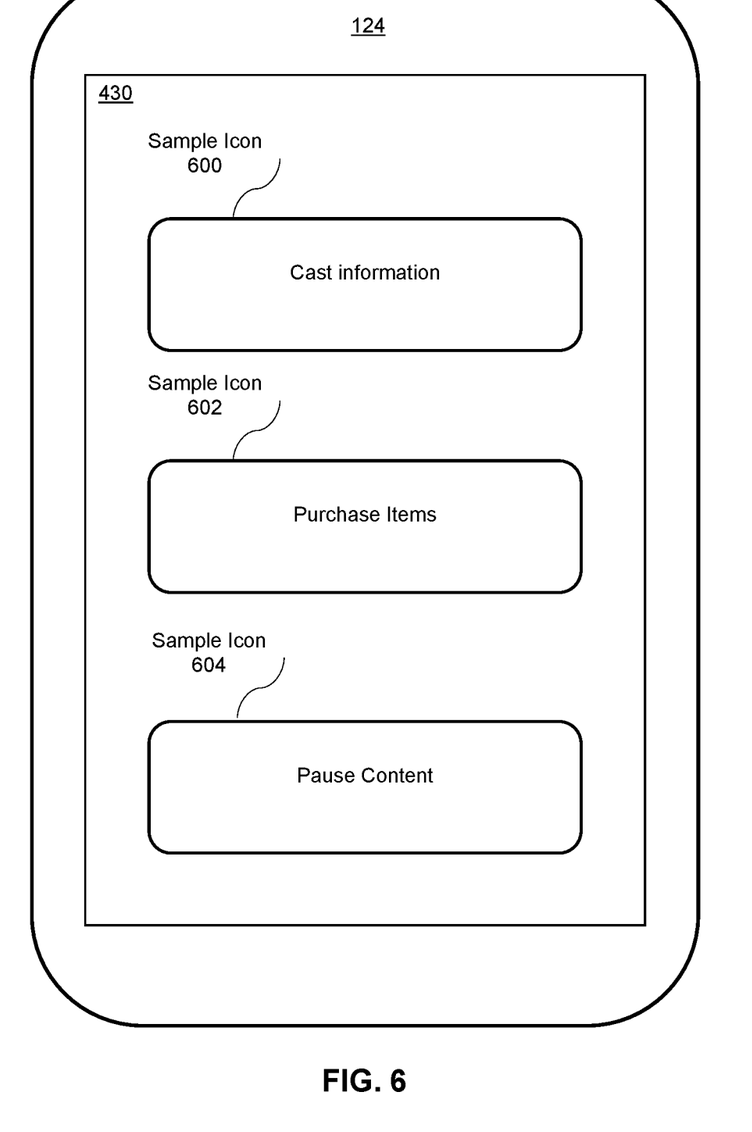
FIG. 6 illustrates a companion device with a graphic user interface, which contains sample icons.

FIG. 6 illustrates companion device 124. Shown on companion device 124 is GUI 430, which contains sample icons 600, 602, and 604.

Returning to FIG. 3, presume that companion device 124 has received the metadata associated with the content timing information from server device 112. In this example, the metadata associated with the content timing information includes cast information data of the cast during the current part of the movie, URL link data for URL links to merchants selling items or clothing during the current part of the movie, and instruction data enabling companion device 124 to cause media device 120 to perform a trick play during the current part of the movie.

Returning to FIG. 4, controller 420 will execute instructions stored on memory 422, including meta data program 423, to cause GUI 430 to display a multitude of icons for user 128 to interact with, including sample icons 600, 602, and 604 as shown in FIG. 6. Further presume that user 128 has interacted with sample icon 600, in which case companion device 124 will display, via GUI 430, extra information about the scene associated with PTS 508 based on the metadata associated with the content timing information that includes cast information data of the cast during the current part of the movie.

In some embodiments, companion device 124 can be used to purchase items related to the program being viewed. For example, presume that user 128 is watching an advertisement for a carbonated beverage, and user 128 interacts with sample icon 602, as they would like to purchase the carbonated beverage. Controller 420 will execute instructions stored on memory 422, including meta data program 423, causing companion device 124 to display a list of URL links based on the URL link data during the current part of the movie, to allow user 128 to purchase the item.

In some embodiments, companion device 124 can be used to operate media device 120. For example, presume that user 128 interacts with sample icon 604, as they would like to pause their content. Controller 420 will execute instructions stored on memory 422, including meta data program 423, causing companion device 124 to enabling companion device 124 to cause media device 120 to perform a trick play during the current part of the movie based on the instruction meta data.

In some embodiments, content timing information may be transmitted from media device 112 to companion device 124 very rapidly. For example, presume that user 128 is watching a live show on television. In order to stay up to date, media device 120 will transmit content timing information in very short intervals, a non-limiting example of which being 0.5 second intervals. Companion device 124, after requesting metadata from server device 112, will continuously receive up to date metadata relating to the program user 128 is viewing. Server device 112 will constantly refresh the metadata manifest so that it is up to date.

Returning to FIG. 3, after the function is performed (S310), algorithm 300 stops (S312).

In some embodiments, server device 112 will obtain input data from companion device 124. Server device will analyze the input data to learn the preferences of user 128 which will make future playback experiences more enjoyable. More specifically, controller 420 is configured to execute instructions stored on memory 422, including meta data program 423, causing companion device 124 to memorize input data from user 128 via GUI 430 and transmit the input data to server device 112. Controller 400 is configured to execute instructions stored on memory 402, including meta data program 403, causing server device 112 to: receive the input data from companion device 124; analyze the input data; and develop user preference data.

While watching something on television, a user may want to know additional information about the origins of a scene, personal information about an actor, or something else related to the program. Often, a user will have a companion device which they will use to find the additional information, non-limiting examples of a companion device including a smart phone, a tablet, etc. Repeatedly pausing the content to find additional information can be frustrating. Conversely, a user could also let the program continue to play as they research, but they may miss an important part of their program as they focus on their companion device. There is a need for a mechanism where content consumption on the companion device is enhanced, thereby improving the playback experience of their program.

In accordance with the present disclosure, a user will operate a companion device while watching content. The media device, while providing content to the user through the use of a display device, will periodically provide the companion device with content timing information. The companion device will analyze the content timing information and will request metadata from a server device, which stores a metadata manifest associated with content timing information for content. The server device will transmit the metadata manifest to the companion device. The companion device will then display interactive icons via a GUI to the user. These icons will allow the user to interact with information related to the content they are watching.

Thus a system and method in accordance with the present disclosure allows the user to have easy access to additional information relating to their program, thereby decreasing downtime from pausing and researching the information manually.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A companion device for use with a server device, a media device and a display device, the server device having stored therein a metadata manifest including metadata and time data associated with content, where said metadata manifest includes both said metadata and said time data associated with content, said server device being configured to transmit the metadata manifest to said companion device, the media device being configured to receive the content for the display device and to receive content timing information associated with the received content, the media device being configured to provide the content to the display device for being displayed thereon, the display device being configured to display displayed media based on the content, the content timing information being additionally associated with the time data associated with the content, said companion device comprising:

a memory having instructions stored therein; and
a processor configured to execute the instructions stored in said memory to cause said companion device to:
 (a) receive the content timing information from the media device without being provided to said server device;
 (b) transmit a manifest request to the server device based on the content timing information received from the media device;
 (c) receive the metadata manifest from the server device that includes the metadata and the time data associated with the content; and
 (d) instruct a companion display of said companion device to display an icon based on the metadata and the time data associated with the content.

2. The companion device of claim 1, wherein said processor is configured to execute instructions stored in said memory to cause said companion device to receive the content timing information from the media device as one type of content timing information selected from a group of content timing information consisting of a presentation time stamp, a playback timer, a wall timer, and combinations thereof.

3. The companion device of claim 1, further comprising:
wherein said processor is configured to execute instructions stored in said memory to cause said companion device to:
receive the metadata manifest from the server device so as to include a plurality of time stamps; and
instruct the companion display to display the icon based on the metadata, and to display a second icon based on the metadata.

4. The companion device of claim 1, further comprising:
wherein said processor is configured to execute instructions stored in said memory to cause said companion device to instruct the companion display to display an icon based on the metadata.

5. The companion device of claim 1, wherein said processor is configured to execute instructions stored in said memory to cause said companion device to wirelessly transmit the manifest request to the server device.

6. The companion device of claim 1, wherein said processor is configured to execute instructions stored in said memory to cause said companion device to transmit the manifest request to the server device via a wired communication channel.

7. A method of operating a companion device for use with a server device, a media device and a display device, the server device having stored therein a metadata manifest including metadata and time data associated with content, where said metadata manifest includes both said metadata and said time data associated with content, said server device being configured to transmit the metadata manifest to said companion device, the media device being configured to receive the content for the display device and to receive content timing information associated with the received content, the media device being configured to provide the content to the display device for being displayed thereon, the display device being configured to display displayed media based on the content, the content timing information being additionally associated with the time data associated with the content, said method comprising:
(a) receiving, via a processor configured to execute instructions stored in a memory, the content timing information from the media device without being provided to said server device;
(b) transmitting, via the processor, a manifest request to the server device based on the content timing information received from the media device;
(c) receiving, via the processor, the metadata and said time data associated with content from the server device.

8. The method of claim 7, wherein said receiving the content timing information from the media device comprises receiving the content timing information from the media device as one type of content timing information selected from a group of content timing information consisting of a presentation time stamp, a playback timer, a wall timer, and combinations thereof.

9. The method of claim 7, further comprising:
receiving the metadata manifest from the server device so as to include a plurality of time stamps; and
instructing a companion display of the companion device to display an icon based on the metadata, and to display a second icon on said companion display based on the metadata.

10. The method of claim 7, further comprising instructing a companion display of the companion device to display an icon based on the metadata.

11. The method of claim 7, wherein said transmitting the manifest request to the server device comprises wirelessly transmitting the manifest request to the server device.

12. The method of claim 7, wherein said transmitting the manifest request to the server device comprises transmitting the manifest request to the server device via a wired communication channel.

13. A non-transitory, computer-readable media having computer-readable instructions stored thereon, the computer-readable instructions being capable of being read by a companion device for use with a server device, a media device and a display device, the server device having stored therein a metadata manifest including metadata and time data associated with content, where said metadata manifest includes both said metadata and said time data associated with content, said server device being configured to transmit the metadata manifest to said companion device, the media device being configured to receive the content for the display device and to receive content timing information associated with the received content, the media device being configured to provide the content to the display device for being displayed thereon, the display device being configured to display displayed media based on the content, the content timing information being additionally associated with the time data associated with the content, wherein the computer-readable instructions are capable of instructing the companion device to perform the method comprising:
(a) receiving, via a processor configured to execute instructions stored in a memory, the content timing information from the media device without being provided to the server device;
(b) transmitting, via the processor, a manifest request to the server device based on the content timing information received from the media device;
(c) receiving, via the processor, the metadata and the time data associated with content from the server device.

14. The non-transitory, computer-readable media of claim 13, wherein the computer-readable instructions are capable of instructing the companion device to perform the method, wherein said receiving the content timing information from the media device comprises receiving the content timing information from the media device as one type of content timing information selected from a group of content timing information consisting of a presentation time stamp, a playback timer, a wall timer, and combinations thereof.

15. The non-transitory, computer-readable media of claim 13, wherein the computer-readable instructions are capable of instructing the companion device to perform the method, wherein said receiving the metadata manifest from the server device comprises:
receiving the metadata manifest from the server device as a plurality of time stamps; and
instructing a companion display of the companion device to display an icon based on the metadata, and to display a second icon on the companion device based on the metadata.

16. The non-transitory, computer-readable media of claim 13, wherein the computer-readable instructions are capable of instructing the companion device to perform the method further comprising instructing a companion display of the companion device to display an icon based on the metadata.

17. The non-transitory, computer-readable media of claim 13, wherein the computer-readable instructions are capable of instructing the companion device to perform the method wherein said transmitting the manifest request to the server device comprises wirelessly transmitting the manifest request to the server device.

18. The non-transitory, computer-readable media of claim 13, wherein the computer-readable instructions are capable of instructing the companion device to perform the method wherein said transmitting the manifest request to the server device comprises transmitting the manifest request to the server device via a wired communication channel.

* * * * *